May 2, 1967
D. H. LOCKLIN
3,317,788
LIGHTING CONTROL CIRCUIT WITH A SINGLE WIRE FROM A D.C. SOURCE
CONTROLLING A PAIR OF SATURABLE REACTORS THAT REGULATE
DOUBLE BASED DIODE RELAXATION OSCILLATOR FIRING
NETWORKS FOR INVERSE PARALLEL SILICON
CONTROLLED RECTIFIERS
Filed Sept. 23, 1964
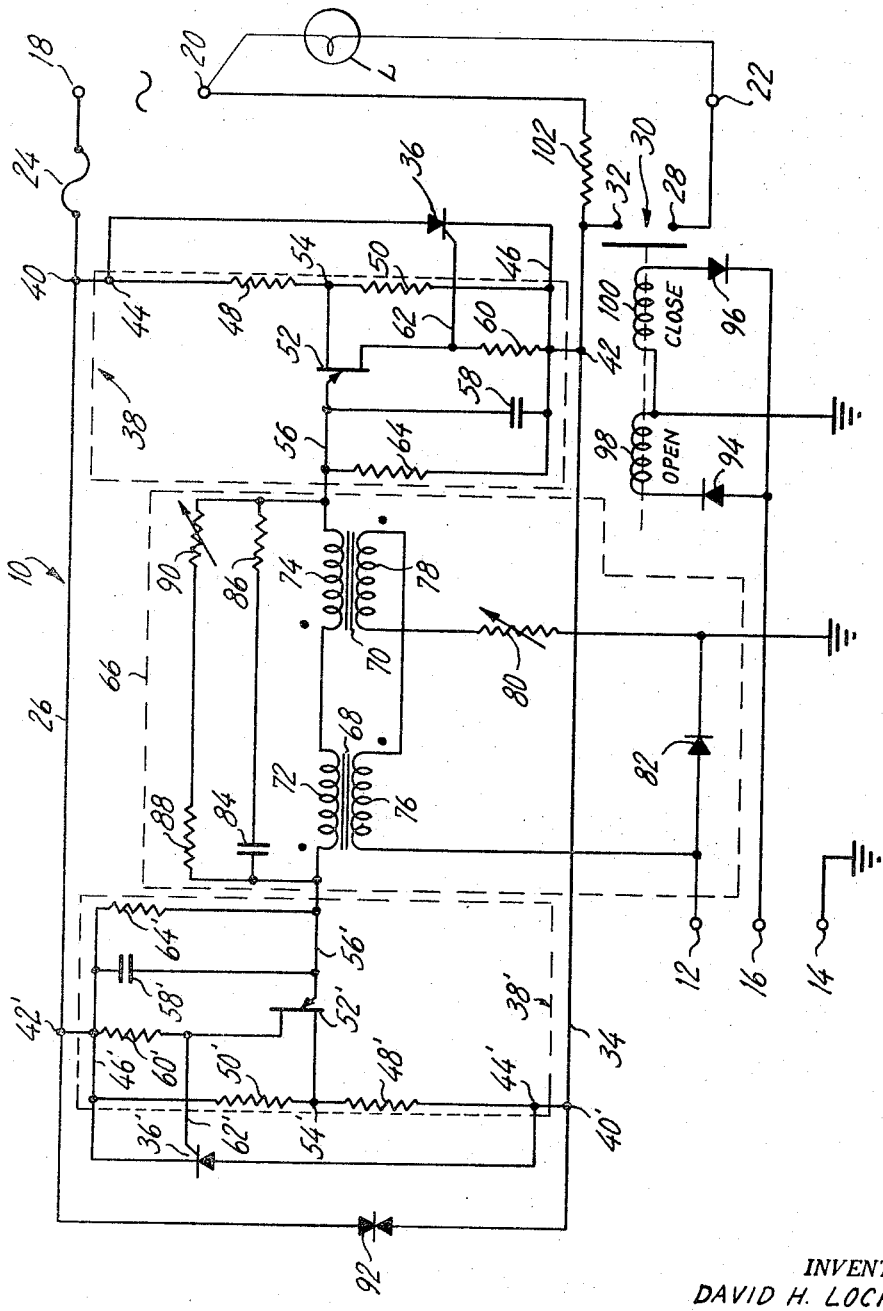
INVENTOR.
DAVID H. LOCKLIN
BY
ATTORNEYS

3,317,788
LIGHTING CONTROL CIRCUIT WITH A SINGLE WIRE FROM A D.C. SOURCE CONTROLLING A PAIR OF SATURABLE REACTORS THAT REGULATE DOUBLE BASED DIODE RELAXATION OSCILLATOR FIRING NETWORKS FOR INVERSE PARALLEL SILICON CONTROLLED RECTIFIERS

David H. Locklin, New Haven, Conn., assignor to ZTX Lighting, Inc., a corporation of New York
Filed Sept. 23, 1964, Ser. No. 398,505
6 Claims. (Cl. 315—194)

This invention relates to a lighting control circuit and in particular is concerned with an electric lighting dimming (in tensity variation) power control circuit of the type that is customarily and most generally used for, although not limited to, theatre and television lighting.

It is an object of my invention to provide an electric lighting dimming power control circuit that has a turn-on time constant, as related to an advance step of control voltage, which limits cold incandescent lamp filament inrush currents in order to eliminate needlessly high junction temperature excursions in the silicon controlled power rectifier.

It is another object of my invention to provide an electric lighting dimming power control circuit which utilizes the simplicity, reliability and ruggedness of a saturable reactor as a control means in combination with the precision pulse forming and firing angle delay capabilities of a solid state relaxation oscillator such as is exhibited by double based diodes and other negative resistance switching devices.

It is another object of my invention to provide an electric lighting dimming power control circuit which will not cause its silicon controlled rectifier to misfire during the transitory periods of connecting the dimmer to an electric lighting load which misfiring would cause undue and unnecessary power semiconductor stress.

It is another object of my invention to provide an electric lighting dimming power control circuit which is amenable to present practices and designs for providing remote station control signals including preset fading, and is readily controllable by pure D.C. signals, as well as half or full wave D.C. signals of any phase displacement to the phase of input power, without using more than a single signal control wire and a common return for all the control units.

It is another object of my invention to provide an electric lighting dimming power control circuit in which the low voltage signal control network is isolated from the power network and in which the firing network is accurate and will provide a broad phase shift, for example, up to 175°.

In the accompanying drawings, the single figure is a wiring diagram of an electric lighting dimming power control circuit constructed in accordance with my invention.

In general, I achieve the various objects of my invention by providing an electric light dimming power control circuit in which the firing network constitutes a solid state relaxation oscillator, preferably in the form of a capacitor bridged by a negative resistance switching device, and in which the control network for the firing network is in the form of a saturable reactor to the control winding of which an external control voltage is applied. The load winding of the saturable reactor is connected to the control terminal of the relaxation oscillator so that the firing of the oscillator is a function of the external control voltage. As a result, the low energy external control voltage is isolated from the power voltage, the control circuit is amenable to remote control, the control network is sluggish to an increased step in control voltage so that a desirable turn-on time period is provided, and the control network is non-phase sensitive whereby it can be regulated by a source of signal voltage having no relationship to the phase of the power voltage.

In the following description of my invention I have only shown and will describe the power unit, including the control network and the firing circuit of a complete lighting control system, inasmuch as my invention is specific to this portion of the system. My invention does not relate to the remote control intensity station, such as described, for example, in United States Letters Patent No. 2,798,984, which in general provides a variable electric characteristic such as voltage current and/or power that is used as a signal to regulate the power unit of the present invention. Such unit in turn creates a variable voltage that is applied to incandescent lamps to furnish a variable intensity of illumination.

Referring now in detail to the drawings, the reference numeral 10 denotes an electric light dimming power control circuit embodying the present invention. Said circuit includes a pair of signal input terminals 12, 14. The terminal 14 is a common return or ground terminal and therefore does not have a signal control wire connected thereto. The terminal 12 is the only one to which a signal input wire is connected. As the circuit is designed, the signal input is a negative D.C. voltage having a maximum in the order of 15 volts negative. This may be supplied as a smooth negative D.C. voltage or as a full wave pulsating negative D.C. voltage or as a half wave pulsating negative D.C. voltage or as a rough filtered negative D.C. voltage. The average voltage applied varies as a function of the lighting intensity to be obtained.

A third input terminal 16 is included to which a polarized pulse is applied at suitable times to connect or disconnect the dimmer circuit to an associated lamp load. The common ground terminal 14 supplies a return path for the polarized pulse.

The circuit 10 is provided with power (high energy) input terminals 18, 20 and with a power output terminal 22. The lighting load L is connected between the terminals 20 and 22. The terminal 18 is the hot power terminal and the terminal 20 is the return, i.e., ground, power terminal. The power input terminals 18, 20 are connected directly to any alternating current single phase supply line, such, for instance, as at a convenience outlet or as might be found at a supply distributed from a branch circuit breaker, or as might be found at a high energy supply such as a bus bar. In the presently preferred manner of utilizing the circuit 10 the dimmer would be supplied from a 15 or 20 ampere branch supply or from a 50 ampere branch supply, depending upon the sizing of the power handling components within the circuit 10.

The high energy supply line to the dimmer can be installed and supplied by the electrical contractor at any given installation in accordance with local practices and codes, while the circuit 10 itself can be pre-assembled at the factory, shipped to the point of use and simply connected to the source of power. The advantages of this arrangement over previous dimming systems is that it allows the local installer to supply the power to the dimmer from any convenient source of alternating current. The dimmer itself can be located conveniently to the lamp load to be controlled so that there is no need to run a plurality of power lines from dimmers located at a separate console to lamp loads located throughout the space to be illuminated. Furthermore, as will soon be apparent, a common source of power need not be used for plural lamp loads or plural dimmers, that is to say, the source of alternating current for any particular dimmer or lamp load may not be in common with the source of alternating current for other similarly connected dimmers which are included in the same total dimming system. It also will be apparent that components such as circuit breakers, wire raceways, distribution openings, etc. that make up the power distribution system need not, as heretofore, be specialized but rather, there may be employed conventional readily and locally obtainable materials which make for a less expensive and simpler power distribution system.

The power input hot (off ground) terminal 18 is directly connected to a conventional semiconductor protection fuse 24 which acts as a coordinated short circuit and overcurrent protector. The fuse 24 is connected to and powers an input voltage, i.e., line, bus 26. The output terminal 22 which is connected to a lamp load is connected within the circuit 10 to a contact 28 of a solenoid operated mechanically held contactor 30 the other contact 32 of which is connected to a power output voltage, i.e., load, bus 34.

The line and load buses 26, 34 are interconnected for conduction of high energy power by two SCR's (silicon controlled rectifiers) 36, 36' connected in inverse parallel so as to alternately pass high energy current in successive half cycles. Each SCR has associated with it a different firing network 38, 38'. The SCR 36 is oriented to conduct and the network 38 to fire on positive half cycles and the SCR and firing network 36', 38' are oriented to conduct and fire on negative half cycles. Since the firing networks are identical, except for their reverse orientation, only the firing network 38 will be described in detail and the components of both networks will be similarly numbered with those of the network 38' primed for distinction.

The network 38 is powered by connection across the line and load buses 26, 34, the connection at the line bus being at a terminal 40 and the connection at the load bus being at a terminal 42.

The voltage across the firing network 38 with the dimmer 10 "off" and the low impedance of a lamp load across the terminals 20, 22 is about equal to the input voltage across the power input terminals 18, 20. Thus, the voltage that feeds the firing network 38 and appears between a terminal 44 (directly connected to the line bus terminal 40) and a cathode bus 46 (directly connected to the load bus 34) approaches line voltage. This voltage is too high for transistor circuitry and to reduce the same to a value compatible with such circuitry a voltage divider consisting of resistors 48, 50 is connected between the terminal 44 and the cathode bus 46. Since the interbase resistance of a typical double based diode 52, such as is employed in the relaxation oscillator of the present invention, varies between 5,000 and 10,000 ohms and is temperature sensitive, the values of the resistors 48, 50 are so selected as to not only provide the proper voltage across said double based diode 52, but also to generally negate the loading variations of said double diode.

The positive voltage component appearing during a positive half cycle between the voltage divider intermediate terminal 54 and the cathode bus 46 is used to synchronize the double based diode 52 operating as a relaxation oscillator. The positive voltage component appearing between a charging bus 56 connected to the emitter of the double based diode 52 and the cathode bus 46 (the source of which voltage component will be discussed herein later) is used to charge a capacitor 58 which cooperates with the double based diode to form the relaxation oscillator. Upon developing a critical (peak point) voltage across the capacitor 58 as established by the positive voltage between the terminal 54 and the cathode bus 46 and the intrinsic stand-off ratio of the double based diode 52, said double based diode 52 will go into a negative resistance condition causing the capacitor 58 to discharge through the double based diode 52 across a resistor 60. The positive going pulse appearing across said resistor 60 is used to directly fire the SCR 36 via a gate lead 62. When the SCR 36 fires, the voltage between the cathode bus 46 and the line terminal 44 collapses, thus effectively shorting out the firing network 38 for the remainder of the positive half cycle. This is advantageous, since by stopping further conduction through the double based diode 52, the heat loss therein is minimized. Such further conduction would merely have the effect of creating subsequent pulses in the same positive half cycle which would be of no effective use because the SCR 36 already is in a state of conduction.

The firing network 38' operates in the manner described for the firing network 38, but during the negative half cycle rather than the positive half cycle.

Thus, the firing networks 38, 38' alternately provide appropriate firing pulses to their respective SCR's 36, 36' delayed in time as a function of the rate of charge of the capacitors 58, 58', respectively.

The voltages on the charging buses 56, 56' which are used to charge the capacitors 58, 58' are A.C. and are fed to these buses via resistors 64, 64' and capacitors 58, 58', respectively. The capacitor 58', the resistor 64' and a control network 66 provide a low impedance charging path for the positive half cycle from the line bus 26 to the charging bus 56, and the capacitor 58, resistor 64 and the control network 66 furnish the same charging action during the negative half cycle for the charging bus 56'. The control network 66 acts as a variable externally controlled impedance regulated by the signal input voltage applied to the signal input terminal 12 for the charging of the capacitors 58, 58' on their respective half cycles. Thus, the capacitor 58 is charged during a positive half cycle on the power input terminal 18 by the following path: the terminal 18, the fuse 24, the terminal 42', the capacitor 58' and the resistor 64' in parallel, the control network 68, the voltage charging bus 56, the capacitor 58, the cathode bus 46, the terminal 42, the contactor 30, the terminal 22, the load L and the terminal 20.

The control network 66 consists of identical saturable reactors 68, 70 with load windings 72, 74 connected in series aiding relationship and control windings 76, 78 connected in series opposing relationship, so that the voltages induced in the control windings by flow of current through the load windings are bucked out (substantially cancelled). Thus, a D.C. voltage signal at the signal input terminal 12 which is negative with respect to the common return terminal 14 controls the degree of saturation of the iron cores of the two saturable reactors 68, 70 and thereby reduces their effective impedance to the A.C. voltage charging buses 56, 56'. As indicated previously, this system will work satisfactorily with the application of any type of D.C. to the signal input terminal 12. Thus, the D.C. may be smooth, as would be derived, for example, from a battery or a heavily filtered full wave rectifier, or it may be merely rough filtered D.C. with a substantial ripple therein, or it may be a full wave or even half wave pulsating D.C. It will be understood, of course, that the D.C. voltage signal is regulated as a function of the desired intensity of illumination to be obtained in the lamp load.

A rheostat 80 connected in series with the control windings limits the D.C. current through said windings 76, 78 and thereby acts as a maximum or over-all gain adjustment. A diode 82 shorts the circulating current that may arise as the result of any mismatching of the two reactors from the control input terminals.

A capacitor 84 and a resistor 86 are connected in series across the series connected load windings 72, 74 of the saturable reactors to form an RC network which corrects the lagging power factor associated with said reactors. This correction is desirable for the purpose of having the charging currents applied to the charging buses 56, 56' and capacitor 58, 58' in phase with the synchronizing voltages at the voltage divider intermediate terminals 54, 54'.

This creates a wider phase shift capability within the firing networks 38, 38'.

A fixed resistor 88 and a variable resistor 90 are also included in the control network 66. These latter two resistors are connected in series with one another and in shunt across the series connected load windings 72, 74 of the saturable reactor 68, 70. Said resistors 88, 90 provide an alternate charging path for charging the buses 56, 56' and the capacitors 58, 58'. The variability of the resistor 90 is provided to control the minimum (bias) output voltage adjustment for the dimmer 10.

The use of saturable reactors in the control network 66 furnishes several advantages in controlling the charging rate on the capacitors 58, 58' and hence the timing of the firing of the SCR's 36, 36'. Firstly, such reactors provide isolation of the power line voltages from the control circuit voltages. Thereby, I am able to employ a common (ground) return wire. This reduces the number of control wires per dimmer. For example, for regulating intensity I need only one wire for supplying a selectively variable signal input voltage to the signal input terminal 12. Secondly, due to the inherent and well known time constants associated with saturable reactors a desirable phase-on delay time period may be achieved each time that a step of increased control voltage is applied between the terminals 12, 14. This phase-on delay will, through the action previously ascribed to the firing networks 38, 38', limit the initial duration of the conduction period of the SCR's 36, 36' as a result of the time required to charge the capacitors 58, 58'. This in turn limits the cold incandescent lamp filament in rush currents over a number of successive cycles, thus reducing needlessly high junction temperature excursions in the power SCR's. Thirdly, due to the ability to feed a direct current controlled signal to the dimmer for controlling an A.C. power output the dimmer is not phase sensitive.

A conventional transient suppression diode 92 connected across the line and load buses 26, 34 shorts out any transient overvoltages appearing between these buses which might otherwise damage or destroy the power SCR's 36, 36' connected between them.

An electrically operated contactor 30, which is mechanically held (e.g., latched) in both its on and off positions, and polarizing diodes 94, 96 associated therewith form a voltage polar sensitive relay which will latch in either open or closed state when its actuating coils are unenergized. In other words, the relay will hold the last state to which it was actuated. The relay will be actuated either to open or close the same, depending upon the polarity of the pulse appearing between the polarized pulse terminal 16 and the return terminal 14. As shown in the circuit diagram an opening coil 98 of the contactor 30 is actuated by application of a positive pulse to the terminal 16 and the closing coil 100 of said contactor 30 is actuated upon the application of a negative pulse to the terminal 16. Closing of the contactor completes the circuit between the load bus 34 and the incandescent lamp load connected between the power output terminal 22 and the power return terminal 20.

In the preferred form of my light dimming electric control circuit a system-wide control bus is connected to the polarized pulse terminal 16. With such an arrangement it is possible to connect or disconnect an entire group of lighting loads to or from their respective dimmers by means of a single suitable pulse on the system bus. It is desirable to have such a disconnect means in order to afford protection against the possibility of semiconductor failure which in most cases is caused by shorting during unattended and non-operating periods and which would lead to the energization of the load circuit. Because of the portable and temporary nature of stage and television lighting failure during such unattended or non-operating periods could in some cases create a hazard of fire or physical damage.

A resistor 102 connected between the load bus 34 and the common power return terminal 20 acts as a path to supply a keep-alive voltage across the line and load buses 26, 34. Such voltage maintains the firing networks 38, 38' in firing condition, that is to say, ready to be fired upon the emission of pulses from the relaxation oscillators. The purpose of this keep-alive circuit is to prevent misfiring due to false synchronizing such as might occur upon the opening and closing of the contactor 30. If the firing networks 38, 38' were not synchronized to line frequency during this transistory period, as they are by the keep-alive voltage, they might cause the SCR's 36, 36' to conduct some portion of the applied voltage to cold lamp filaments on turn-on and thereby create needless semiconductor junction stresses.

By way of example and for the sake of completeness I have set forth below the values or types of the various components, the values being appropriate for a signal input ranging up to about 15 volts minus D.C.

| Reference Numeral | Description | Value or Type |
| --- | --- | --- |
| 24 | Semiconductor protection fuse. | Buss Kaa 15 amp. |
| 30 | Contactor | Sierra #1070C. |
| 36 | } Matched pair of silicon controlled rectifiers. | 2N2576 (sized to load). |
| 36' | | |
| 48 | Resistor | 15K ohms. |
| 50 | ___do___ | 4.7K ohms. |
| 52 | Double based diode | 2N2646. |
| 58 | Capacitor | 0.22 mfd. |
| 60 | Resistor | 27 ohms. |
| 64 | ___do___ | 3.9K ohms. |
| 68 | } Matched pair of saturable reactors. | Berkshire Transformer Company, Kent, Conn. BTC5646. |
| 70 | | |
| 80 | Rheostat | 4K ohms. |
| 82 | Diode | 1N1692. |
| 84 | Capacitor | 0.047 mfd. |
| 86 | Resistor | 39K ohms. |
| 88 | ___do___ | 100K ohms. |
| 90 | Variable resistor | 10K ohms. |
| 92 | Transient suppression diode. | GE6RS20SP4B4. |
| 94 | Polarizing diode | 1N1692. |
| 96 | ___do___ | 1N1692. |
| 102 | Resistor | 4.7K ohms. |

It thus will be seen that I have provided a device and method of using the same which achieve the several objects of my invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described my invention, I claim as new and desire to secure by Letters Patent:

1. A circuit for controlling the power supplied to an incandescent lamp load by regulating the interval of current conduction of each half cycle of an alternating current supply, comprising:
 (A) an alternating current supply;
 (B) a pair of input leads connected in circuit with the alternating current supply;
 (C) an incandescent lamp load series connected between one of said input leads and the alternating current supply;
 (D) a pair of silicon controlled rectifiers connected in inverse parallel across said input leads;
 (E) a first and a second firing circuit means connected in inverse relation across said input leads so that said first firing circuit means exercises control over an associated one of said silicon controlled rectifiers in one half of each cycle of the alternating current supply and said second firing circuit means exercises control over the associated other silicon controlled rectifier in the other half of each cycle of the alternating current supply, each of said firing circuit means including (I) a double based diode having two bases and an emitter,
(II) circuit means connecting one base to one of said input leads,
(III) a first resistor connected in circuit with the other base and the other input lead,
(IV) a capacitor and a second resistor connected in circuit with the emitter and said other input lead, and
(V) circuit means connecting said other base in circuit with the control terminal of the associated silicon controlled rectifier, and
(F) a control network means for said firing circuit means, said control network means including
(I) two saturable reactors,
(a) each comprising a load winding and a control winding,
(II) circuit means connecting said lead windings in series aiding relationship between the emitters of the two firing circuit means,
(III) a single D.C. signal input terminal,
(IV) a ground terminal, and
(V) circuit means connecting said control windings in series opposing relationship between the single D.C. signal input terminal and the ground terminal for varying the effective impedance of the load windings and thereby regulating the charging rate on the capacitor associated with the silicon controlled rectifier then potentially effective for the prevailing half cycle of the alternating current supply,
(VI) the charging path of said capacitor including the capacitor and the second resistor of the firing circuit means associated with the silicon controlled rectifier then potentially ineffective for said prevailing half cycle and also including the load windings.

2. A circuit as set forth in claim 1 wherein the charging path for the capacitor also includes a high value resistor and circuit means connecting said resistor in shunt across the load windings of the saturable reactors to provide an alternate charging path for said capacitor.

3. A circuit as set forth in claim 2 wherein the high value resistor is variable to provide a minimum output voltage adjustment for the dimming circuit.

4. A circuit as set forth in claim 1 wherein the charging path for the capacitor also includes an RC network and circuit means connecting said network in shunt across the load windings of the saturable reactors to correct the lagging power factor of said reactors.

5. A circuit as set forth in claim 1 wherein a variable resistor is included in the circuit means connecting the control windings of the saturable reactors in series opposing relationship between the single D.C. signal input terminal and the ground terminal to provide a gain adjustment.

6. A circuit as set forth in claim 1 wherein a rectifier is connected in shunt across the control windings of the saturable reactors to short circulating current in said control windings.

References Cited by the Examiner
UNITED STATES PATENTS

| | | | |
|---|---|---|---|
| 3,197,691 | 7/1965 | Gilbert | 321—25 |
| 3,192,466 | 6/1965 | Sylvan et al. | 307—88.5 |
| 3,219,910 | 10/1965 | Klimo | 321—47 |
| 3,222,577 | 12/1965 | Kennedy | 307—88.5 |

JOHN W. HUCKERT, *Primary Examiner.*

J. D. CRAIG, *Assistant Examiner.*